(12) United States Patent
Grüner et al.

(10) Patent No.: US 11,888,420 B2
(45) Date of Patent: Jan. 30, 2024

(54) CONTROL LOOP PERFORMANCE MONITORING IN VARIABLE FREQUENCY DRIVE

(71) Applicant: ABB Schweiz AG, Baden (CH)

(72) Inventors: Sten Grüner, Baden-Württemberg (DE); Vesa Mäkelä, Helsinki (FI)

(73) Assignee: ABB Schweiz AG, Baden (CH)

( * ) Notice: Subject to any disclaimer, the term of this patent is extended or adjusted under 35 U.S.C. 154(b) by 56 days.

(21) Appl. No.: 17/448,443

(22) Filed: Sep. 22, 2021

(65) Prior Publication Data

US 2022/0103106 A1 Mar. 31, 2022

(30) Foreign Application Priority Data

Sep. 28, 2020 (EP) .................................... 20198651

(51) Int. Cl.
*H02P 6/08* (2016.01)
*H02P 23/00* (2016.01)
*H02M 1/00* (2006.01)

(52) U.S. Cl.
CPC ...... *H02P 23/0077* (2013.01); *H02M 1/0025* (2021.05); *H02P 6/08* (2013.01)

(58) Field of Classification Search
CPC ...... H02P 23/0077; H02P 6/08; H02M 1/0025
See application file for complete search history.

(56) References Cited

U.S. PATENT DOCUMENTS

| 8,564,233 B2 * | 10/2013 | Kidd | H02P 25/04 |
| | | | 318/632 |
| 8,914,300 B2 * | 12/2014 | Sustaeta | G05B 13/024 |
| | | | 700/99 |
| 2002/0190685 A1 * | 12/2002 | Sadasivam | H02P 23/26 |
| | | | 318/727 |
| 2009/0236432 A1 | 9/2009 | Malloy | |

(Continued)

OTHER PUBLICATIONS

Bolgova, Veronika, et al; "Influence of VFD parameters on voltage stresses in low voltage windings"; 2016 57th International Scientific Conference on Power and Electrical Engineering of Riga Technical University (RTUCON); Riga, Latvia; Oct. 13, 2016; 5 Pages.

(Continued)

*Primary Examiner* — Rina I Duda
(74) *Attorney, Agent, or Firm* — Whitmyer IP Group LLC

(57) ABSTRACT

Disclosed is a method for control loop performance monitoring in a variable frequency drive. A set of data is inputted to one or more control loop performance monitoring algorithms comprised in the variable frequency drive, wherein the set of data comprises at least a measured value of a process variable, a target value for the process variable, a set of controller input parameters, and a controller output. An output from each of the one or more control loop performance monitoring algorithms is obtained based at least partly on the set of data. One or more key performance indicator values indicative of control loop performance are determined based at least partly on the output from each of the one or more control loop performance monitoring algorithms. The set of controller input parameters is adjusted based at least partly on the one or more key performance indicator values.

20 Claims, 6 Drawing Sheets

(56) References Cited

U.S. PATENT DOCUMENTS

| | | | | |
|---|---|---|---|---|
| 2010/0231146 A1* | 9/2010 | Beck | ............... | H02P 27/06 |
| | | | | 318/143 |
| 2011/0129368 A1* | 6/2011 | Smith | ............... | F04B 49/06 |
| | | | | 318/244 |
| 2011/0130850 A1 | 6/2011 | Zheng et al. | | |
| 2018/0320684 A1* | 11/2018 | Rosca | ............... | F04B 49/20 |
| 2019/0178523 A1* | 6/2019 | Zimmerman | ............ | F24F 11/66 |
| 2020/0112279 A1 | 4/2020 | Trehin | | |

OTHER PUBLICATIONS

Extended European Search Report; Application No. 20198651.0; Completed: Feb. 16, 2021; dated Feb. 24, 2021; 11 Pages.

* cited by examiner

CONTROL LOOP PERFORMANCE MONITORING IN VARIABLE FREQUENCY DRIVE

RELATED APPLICATIONS

This application claims priority to European patent application no. 20198651, filed on Sep. 28, 2020, the contents of which is hereby incorporated herein by reference in its entirety.

FIELD

Various exemplary embodiments relate to industrial process controllers and to control loop performance monitoring.

BACKGROUND

A control loop may be used in an industrial control system to maintain a process variable at a desired reference point, which may also be referred to as a set point. The control loop may comprise, for example, a sensor, an industrial process controller, and a final control element. The sensor may measure the process variable and transmit the measurement to the industrial process controller. The industrial process controller may then manipulate the final control element in order to maintain the process variable at the desired set point, i.e. to minimize the difference between the measured process variable and the desired set point. However, the control loop may experience malfunctions that result in poor control of the process variable. Control loop performance monitoring may be used to monitor the performance of the control loop, to detect an underperforming control loop, and to help diagnose control loop malfunctions. It is desirable to improve control loop performance monitoring in order to provide additional information about the process to the industrial process controller, and thus enable more accurate control of the process variable.

SUMMARY

The scope of protection sought for various exemplary embodiments is set out by the independent claims. The exemplary embodiments and features, if any, described in this specification that do not fall under the scope of the independent claims are to be interpreted as examples useful for understanding various exemplary embodiments.

According to an aspect, there is provided a variable frequency drive comprising means for inputting a set of data to one or more control loop performance monitoring algorithms comprised in the variable frequency drive, wherein the set of data comprises at least a measured value of a process variable, a target value for the process variable, a set of controller input parameters, and a controller output; obtaining an output from each of the one or more control loop performance monitoring algorithms based at least partly on the set of data; determining one or more key performance indicator values based at least partly on the output from each of the one or more control loop performance monitoring algorithms, wherein the one or more key performance indicator values are indicative of control loop performance; and adjusting the set of controller input parameters based at least partly on the one or more key performance indicator values.

According to another aspect, there is provided a variable frequency drive comprising at least one processor, and at least one memory including computer program code, wherein the at least one memory and the computer program code are configured, with the at least one processor, to cause the variable frequency drive to: input a set of data to one or more control loop performance monitoring algorithms comprised in the variable frequency drive, wherein the set of data comprises at least a measured value of a process variable, a target value for the process variable, a set of controller input parameters, and a controller output; obtain an output from each of the one or more control loop performance monitoring algorithms based at least partly on the set of data; determine one or more key performance indicator values based at least partly on the output from each of the one or more control loop performance monitoring algorithms, wherein the one or more key performance indicator values are indicative of control loop performance; and adjust the set of controller input parameters based at least partly on the one or more key performance indicator values.

According to another aspect, there is provided a system comprising at least a sensor device, a variable frequency drive, and a motor. The sensor device is configured to: measure a value of a process variable associated with a physical process; and transmit the measured value of the process variable to the variable frequency drive. The variable frequency drive is configured to: receive the measured value of the process variable from the sensor device; input a set of data to one or more control loop performance monitoring algorithms comprised in the variable frequency drive, wherein the set of data comprises at least the measured value of a process variable, a target value for the process variable, a set of controller input parameters, and a controller output; obtain an output from each of the one or more control loop performance monitoring algorithms based at least partly on the set of data; determine one or more key performance indicator values based at least partly on the output from each of the one or more control loop performance monitoring algorithms, wherein the one or more key performance indicator values are indicative of control loop performance; and adjust the controller output by adjusting the set controller input parameters based at least partly on the one or more key performance indicator values. The motor is configured to adjust the physical process via an actuator based at least partly on the adjusted controller output.

According to another aspect, there is provided a method comprising inputting, by a variable frequency drive, a set of data to one or more control loop performance monitoring algorithms comprised in the variable frequency drive, wherein the set of data comprises at least a measured value of a process variable, a target value for the process variable, a set of controller input parameters, and a controller output; obtaining, by the variable frequency drive, an output from each of the one or more control loop performance monitoring algorithms based at least partly on the set of data; determining, by the variable frequency drive, one or more key performance indicator values based at least partly on the output from each of the one or more control loop performance monitoring algorithms, wherein the one or more key performance indicator values are indicative of control loop performance; and adjusting, by the variable frequency drive, the set of controller input parameters based at least partly on the one or more key performance indicator values.

According to another aspect, there is provided a computer program comprising instructions for causing a variable frequency drive to perform at least the following: input a set of data to one or more control loop performance monitoring algorithms comprised in the variable frequency drive, wherein the set of data comprises at least a measured value of a process variable, a target value for the process variable, a set of controller input parameters, and a controller output; obtain an output from each of the one or more control loop performance monitoring algorithms based at least partly on the set of data; determine one or more key performance indicator values based at least partly on the output from each of the one or more control loop performance monitoring algorithms, wherein the one or more key performance indicator values are indicative of control loop performance; and adjust the set of controller input parameters based at least partly on the one or more key performance indicator values.

According to another aspect, there is provided a computer readable medium comprising program instructions for causing a variable frequency drive to perform at least the following: input a set of data to one or more control loop performance monitoring algorithms comprised in the variable frequency drive, wherein the set of data comprises at least a measured value of a process variable, a target value for the process variable, a set of controller input parameters, and a controller output; obtain an output from each of the one or more control loop performance monitoring algorithms based at least partly on the set of data; determine one or more key performance indicator values based at least partly on the output from each of the one or more control loop performance monitoring algorithms, wherein the one or more key performance indicator values are indicative of control loop performance; and adjust the set of controller input parameters based at least partly on the one or more key performance indicator values.

According to another aspect, there is provided a non-transitory computer readable medium comprising program instructions for causing a variable frequency drive to perform at least the following: input a set of data to one or more control loop performance monitoring algorithms comprised in the variable frequency drive, wherein the set of data comprises at least a measured value of a process variable, a target value for the process variable, a set of controller input parameters, and a controller output; obtain an output from each of the one or more control loop performance monitoring algorithms based at least partly on the set of data; determine one or more key performance indicator values based at least partly on the output from each of the one or more control loop performance monitoring algorithms, wherein the one or more key performance indicator values are indicative of control loop performance; and adjust the set of controller input parameters based at least partly on the one or more key performance indicator values.

BRIEF DESCRIPTION OF THE DRAWINGS

In the following, various exemplary embodiments will be described in greater detail with reference to the accompanying drawings, in which.

DETAILED DESCRIPTION

The following embodiments are exemplary. Although the specification may refer to "an", "one", or "some" embodiment(s) in several locations of the text, this does not necessarily mean that each such reference is made to the same embodiment(s), or that a particular feature only applies to a single embodiment. Single features of different embodiments may also be combined to provide other embodiments.

Various exemplary embodiments may be applicable to any process in an industrial plant, including a processing system and/or an industrial manufacturing related process and/or a system for a technical process, which is at least partly automated, providing different measured/sensored values for a plurality of variables on one or more devices (equipment) and/or on one or more processes. A non-limiting list of examples includes power plants, pulp and paper plants, manufacturing plants, chemical processing plants, power transmission systems, mining and mineral processing plants, oil and gas systems, data centers, ships, and transportation fleet systems.

Different embodiments and examples are described below using single units, models, equipment and memory, without restricting the embodiments/examples to such a solution. Concepts called cloud computing and/or virtualization may be used. Virtualization may allow a single physical computing device to host one or more instances of virtual machines that appear and operate as independent computing devices, so that a single physical computing device can create, maintain, delete, or otherwise manage virtual machines in a dynamic manner. It is also possible that device operations will be distributed among a plurality of servers, nodes, devices or hosts. In cloud computing network devices, computing devices and/or storage devices provide shared resources. Some other technology advancements, such as Software-Defined Networking (SDN) may cause one or more of the functionalities described below to be migrated to any corresponding abstraction or apparatus or device. Therefore, all words and expressions should be interpreted broadly, and they are intended to illustrate, not to restrict, the exemplary embodiments.

Figure 1:
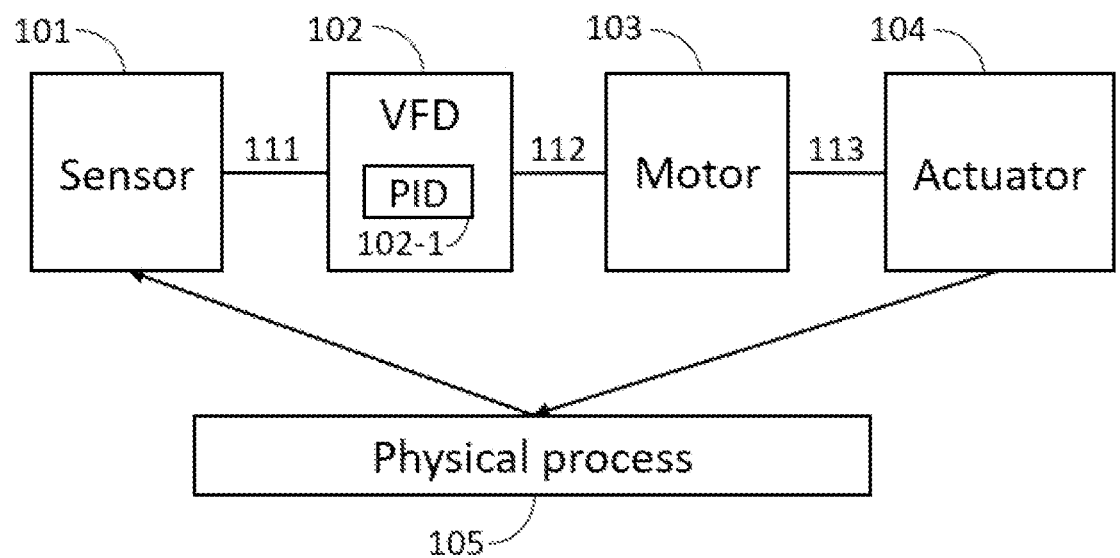
FIG. 1 illustrates a simplified architecture of a system.

FIG. 1 illustrates a system according to an exemplary embodiment. It should be noted that FIG. 1 illustrates a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements, and protocols used in or for communication are irrelevant to the exemplary embodiments. Therefore, they need not be discussed in more detail here.

Referring to FIG. 1, a variable frequency drive, VFD, 102 is connected to a motor 103 via a second connection 112. The second connection 112 may be an electrical connection, such as a power cable. The variable frequency drive 102 is used to control the motor speed and torque by varying the motor input frequency and voltage. The motor 103 may be an electric motor driven by an alternating current, AC. The motor 103 is used to operate an actuator 104, such as a pump, fan or compressor, via a mechanical connection 113. The actuator 104 influences a physical process 105, such as a liquid flow within a pipe, which is sensed, i.e. measured, by a sensor device 101, such as a flow sensor. The physical process may also be affected by disturbances, which may be measured and compensated for by means of a disturbance variable. The physical process may also be referred to as an industrial process. The sensor device 101 measures one or more process variable values, such as flow, pressure, temperature, consistency, speed, current, level, or pH, associated with the physical process. In other words, the sensor device 101 may comprise a transducer that converts a physical property of the process 105, i.e. a process variable, into a signal representing the value of the process variable that can be transmitted. The sensor device 101 may be in direct or indirect contact with the physical process 105. The sensor device 101 is configured to transmit the measured process variable value(s) to the variable frequency drive 102 via a first connection 111 by a transmitter comprised in the sensor device 101. The first connection 111 may be a wired electrical connection, i.e. a cable, or a wireless connection such as a Bluetooth, Wi-Fi or Li-Fi (light fidelity) connection. The variable frequency drive 102 is configured to receive the measurements from the sensor device 101 via the first connection 111. The variable frequency drive may be further configured to store the received measurements in an internal memory of the variable frequency drive 102, or in an external memory such as a cloud database.

The variable frequency drive 102 may comprise or be connected to a process controller 102-1, for example a proportional-integral-derivative, PID, controller. The process controller may also be referred to as a closed-loop controller. The process controller may be a hardware device or it may be software code implemented in a microprocessor-based device. The process controller may be configured to send control signals to the variable frequency drive 102. The process controller may control dynamic industrial processes, in which for example the speed and/or torque applied to the motor 103 has to be varied according to the needs of the industrial process. In other words, the process controller may allow the variable frequency drive to automatically control the actuator to match a pre-defined set-point that is compared to the sensor measurements, for example in order to maintain a certain constant flow.

The variable frequency drive 102 may store, for example in an internal memory of the variable frequency drive, information on control parameter settings, for example present values of parameters such as controller gains, ramp times, output frequency, output voltage, output power, motor speed, motor torque, motor current, motor shaft power (i.e. the estimated mechanical power at the motor shaft), motor data, limits, magnetization settings, and/or signal filtering settings. The variable frequency drive 102 may also store internal technical information recorded during the operation of the variable frequency drive, for example information on key performance indicators, such as load current histogram, torque ripple, torque vs. speed curves, and/or power vs. speed curves, temperature, voltage, and/or other information such as resonance frequencies and/or load inertias. The variable frequency drive 102 may be equipped with a short-range radio interface, for example Bluetooth or Wi-Fi, or with some other wireless communication interface such as Li-Fi. The wireless communication interface may be comprised in the variable frequency drive 102 or, for example, in a control panel of the variable frequency drive 102.

Figure 2:
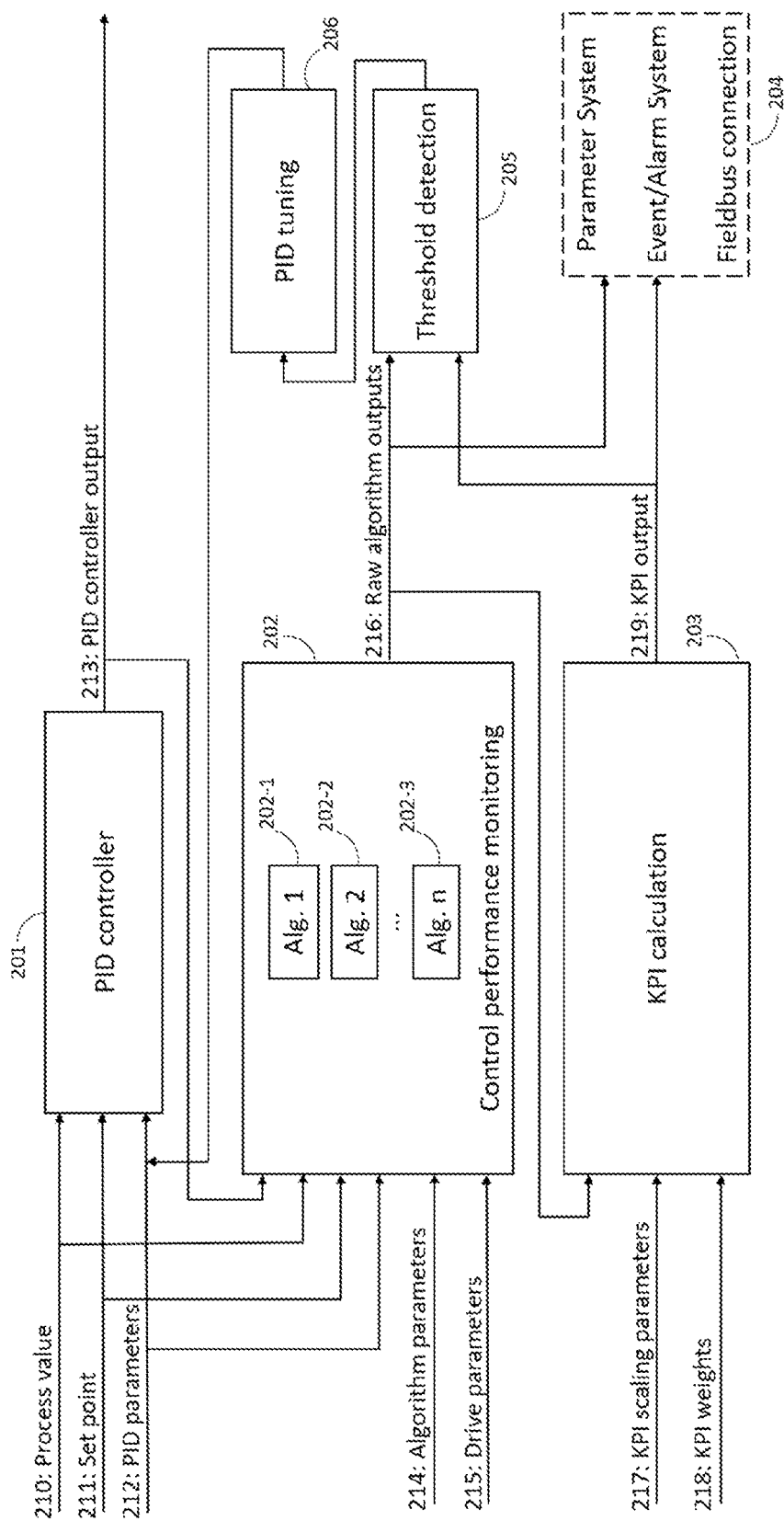
FIG. 2 illustrates a schematic block diagram according to an exemplary embodiment.

FIG. 2 illustrates a schematic block diagram for control loop performance monitoring in a variable frequency drive according to an exemplary embodiment. The variable frequency drive comprises an embedded PID controller 201 and a built-in control performance monitoring system.

A measured value of a process variable 210, a user-defined set point 211, i.e. target value for the process variable, and a set of PID input parameters 212 are provided as input to a PID controller 201. The process variable may be, for example, flow or any other physical quantity. Herein flow may refer, for example, to the flow of a liquid or a gas though a cross-section or a surface boundary. The measured value of the process variable may be received from a sensor device, for example. The user-defined set point and the PID input parameters may be stored on a drive parameter system comprised in the variable frequency drive and obtained from the drive parameter system, for example. The set of PID input parameters, which may also be referred to as controller input parameters, may comprise parameters such as a proportional controller gain (denoted as kP), integration time (denoted as kI), and derivation time (denoted as kD).

The proportional gain, integration time and derivation time may also be referred to as tuning parameters, which may be used to adjust the PID controller output. In other words, the set of PID input parameters may be subject to tuning, i.e. adjustment, in the PID controller 201. The difference between the measured value of the process variable and the set point may be referred to as an error. The objective of the PID controller 201 may be to minimize the error by adjusting the PID input parameters. The PID controller 201 provides an output 213 for example to a motor controlled by the variable frequency drive in order to adjust the process variable. The PID controller output 213 may comprise, for example, a speed and/or a torque applied to the motor. The motor may be connected to a physical process associated with the process variable for example via an actuator, such as a pump, influencing the physical process. The PID controller output may also be referred to as a control action herein.

The Laplace domain definition for a PID algorithm used by a PID control loop may be defined for example as:

$$U = kP\left(e + \frac{1}{kI(s)} + kD(s)\right)$$

where kP is the proportional controller gain, kI is the integration time in seconds, kD is the derivation time in seconds, and e is the error, i.e. the difference between the measured value of the process variable and the set point.

The measured value of the process variable 210, the set point 211, the PID input parameters 212 and the PID controller output value 213 are also provided as input to one or more control loop performance monitoring algorithms 202-1, 202-2, 202-3 comprised in a control performance monitoring module 202. A set of algorithm parameters 214 and a set of drive parameters 215 may be further provided as input to the one or more control loop performance monitoring algorithms. The one or more control loop performance monitoring algorithms may analyze for example the time trend of a plurality of measured values of the process variable and the PID controller output, which may be provided to the control loop performance monitoring algorithm(s) continuously or at pre-defined time intervals.

The set of drive parameters 215 may comprise, for example, a minimum limit for the PID controller output, a maximum limit for the PID controller output, a parameter indicating whether the PID controller is enabled or not, and/or a parameter indicating whether the PID controller output is frozen or not. Herein freezing refers to keeping the PID controller output at the value that it had before the freeze was enabled. Freezing may be used, for example, when the sensor device providing feedback on the process needs to be serviced without stopping the process. Thus, the one or more control loop performance monitoring algorithms may use the set of drive parameters for example to detect whether the PID controller is enabled, whether the minimum or maximum limits are triggered, and/or whether the PID controller output is frozen. Without this detection capability based on the set of drive parameters, the one or more control loop performance monitoring algorithms might measure performance of a disabled or frozen PID controller, and thus the one or more control loop performance monitoring algorithms might generate incorrect output values in such a case.

The raw output 216 of the one or more control loop performance monitoring algorithms may either be used directly or they may contribute to the calculation of one or more control loop performance monitoring key performance indicator, KPI, values. The raw output 216 of the one or more control loop performance monitoring algorithms, a set of KPI weights 218, and/or a set of KPI scaling parameters 217 may be provided as input to a KPI calculation module 203. The raw output 216 from each of the one or more control loop performance monitoring algorithms may then be weighted to provide a key performance indicator value for example by multiplying the algorithm output with the associated KPI weight value. Different KPI weight values may be used for different algorithm outputs in order to prioritize the output of one control loop performance monitoring algorithm over the output from one or more other control performance monitoring algorithms. Alternatively, the raw output 216 from each of the one or more control loop performance monitoring algorithms may be converted to a scaled value between 0-100% by using the KPI scaling parameters, and the weight value may then be applied to the scaled value. As a non-limiting example, the weight may be a value between 0 and 1. The set of KPI weights and the set of KPI scaling parameters may be pre-defined or defined by a user, for example.

The states and/or values of the KPIs may be used to indicate the presence of a problem or a malfunction associated with the control loop. The KPIs may be Boolean in nature, for example bad/good, yes/no, or problem/no problem, wherein bad, yes and problem may indicate the presence of a problem. Alternatively, the value of a KPI may be used to indicate the quality of the control aspect underlying the KPI or the magnitude of a problem, and the value of the KPI may be based on a scale, such as 0-100%, wherein 0% may indicate for example the best quality, and 100% may indicate for example the worst quality, i.e. the biggest problem. The KPIs may be, for example, point KPIs, data window statistical analysis KPIs, persistence KPIs, and/or time trend transform KPIs.

A point KPI may compare a measured value to a pre-defined threshold. If the measured value exceeds the threshold, the state of the KPI may change for example from no problem to problem, and an action may be generated. For example, an alarm may be generated and annunciated.

A data window statistical analysis KPI may use data over a certain time window and map it into a statistical result. Examples of statistical mapping may include mean, mode, median, maximum, minimum, standard deviation, variance, covariance, and slope. Once the statistical value has been determined for the window size, the statistical result may be used in a similar manner as the point KPI. For example, if the variability of a data set window is calculated and the standard deviation is above a pre-defined threshold, then the state of the KPI changes and a corresponding action is triggered.

A persistence KPI may be used to avoid false positives, which may occur with a point KPI. A false positive may be defined as a KPI that exceeds its threshold, but is not related to an actual problem. For example, a noise spike, a machine shut down or a production change may cause a false positive. A persistence KPI may be applied to a point KPI. For example, a persistence KPI may indicate a count of the number of times that a point KPI threshold is exceeded in a user-defined analysis window. As another example, a persistence KPI may indicate an evaluation of the time during which a threshold is exceeded.

A time trend transform KPI may utilize mathematical analysis of a data window. A series of transforms, such as Fourier series, auto correlation, and/or histograms, may be applied to the data window. A time trend transform may convert the window of time-based data into a new domain, which may enable detecting details that may be hidden in the original time trend. For example, a time trend that has a pure tone oscillatory nature may be difficult to detect in a time trend. However, if that time trend is converted into a Fourier series, then the amplitude and frequency of the oscillatory problem may be detected more easily.

The KPI output 219, i.e. the key performance indicator(s), and/or the raw outputs of the one or more control loop performance monitoring algorithms may be provided to one or more systems 204, such as a parameter system and/or an event/alarm system. In the parameter system, the KPI output and/or the output of the one or more control loop performance monitoring algorithms may be displayed for example to a user in a graphical user interface as additional parameters associated with the variable frequency drive and/or its PID controller. In the event/alarm system, the KPI output and/or the output of the one or more control loop performance monitoring algorithms may be used to trigger warnings or alarms for example based on pre-defined threshold levels, thus enabling predictive maintenance based on the change in the PID performance. In addition, the KPI output and/or the output of the one or more control loop performance monitoring algorithms may be provided to one or more external systems, such as a distributed control system, DCS and/or a supervisory control and data acquisition, SCADA, system, for example via a fieldbus connection of the variable frequency drive. Thus, for example a problem or a malfunction with the physical process, motor or actuator may be indicated to an external system, such as a DCS or SCADA system.

The raw output 216 from the one or more control loop performance monitoring algorithms and/or the KPI output 219 may be provided as input to a threshold detection module 205. If the threshold detection module 205 detects suboptimal control loop performance, for example by detecting that the KPI output exceeds or is below a pre-defined threshold value, then the threshold detection module 205 may provide an indication of the suboptimal control loop performance to a PID tuning module 206.

Once a suboptimal control loop performance has been detected, an automatic or guided PID controller tuning may be proposed to the user or operator by the PID tuning module 206. Alternatively, the PID controller tuning may be performed automatically without user involvement. In the PID controller tuning, the PID input parameters are adjusted, which results in an adjusted PID controller output that is used to control the motor in order to improve the control loop performance.

The PID tuning module 206 may tune the PID controller for example by using the Ziegler-Nichols tuning method or other techniques. The Ziegler-Nichols tuning method may be performed by setting the integral and derivative gains to zero. The proportional gain is then increased for example from zero until it reaches the ultimate gain, at which the output of the control loop has stable and consistent oscillations. The ultimate gain and the oscillation period are then used to set the proportional, integral and derivative gains depending on the type of controller used and the desired behaviour.

Figure 3:
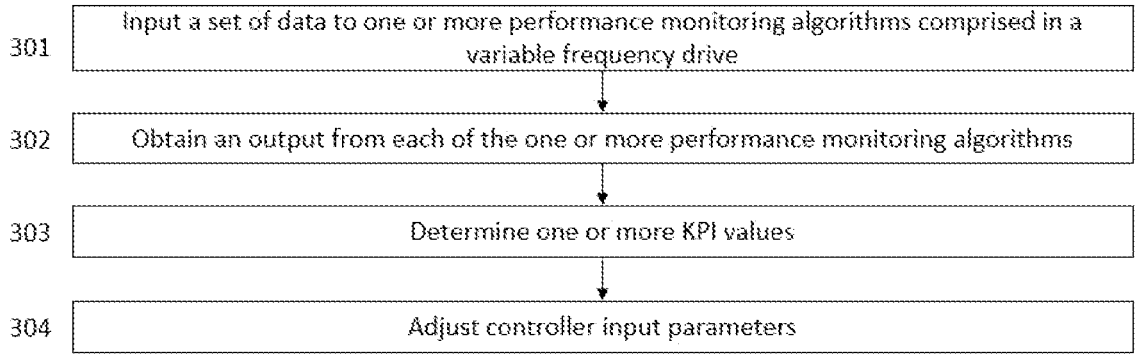
FIGS. 3-9 illustrate flow charts according to some exemplary embodiments.

FIG. 3 illustrates a flow chart according to an exemplary embodiment. Referring to FIG. 3, a set of data is inputted 301 to one or more control loop performance monitoring algorithms comprised in a variable frequency drive. The set of data comprises at least a measured value of a process variable, a target value for the process variable, a set of controller input parameters, and a controller output. The measured value of the process variable may be received from a sensor device, for example. The target value, i.e. set point, may be pre-defined or entered by a user, for example. The controller output may be obtained from a controller such as a PID controller. The controller output may comprise, for example, a speed and/or a torque applied to a motor connected to the variable frequency drive.

An output from each of the one or more control loop performance monitoring algorithms is then obtained 302 based at least partly on the set of data. One or more key performance indicator values are determined 303 based at least partly on the output from each of the one or more control loop performance monitoring algorithms, wherein the one or more key performance indicator values are indicative of control loop performance. For example, the one or more key performance indicator values may indicate a magnitude of a problem, a malfunction, or quality associated with the control loop performance.

The set of controller input parameters is adjusted 304 based at least partly on the one or more key performance indicator values.

The process of FIG. 3 may be iterative so that it returns to step 301 after step 304.

Figure 4:
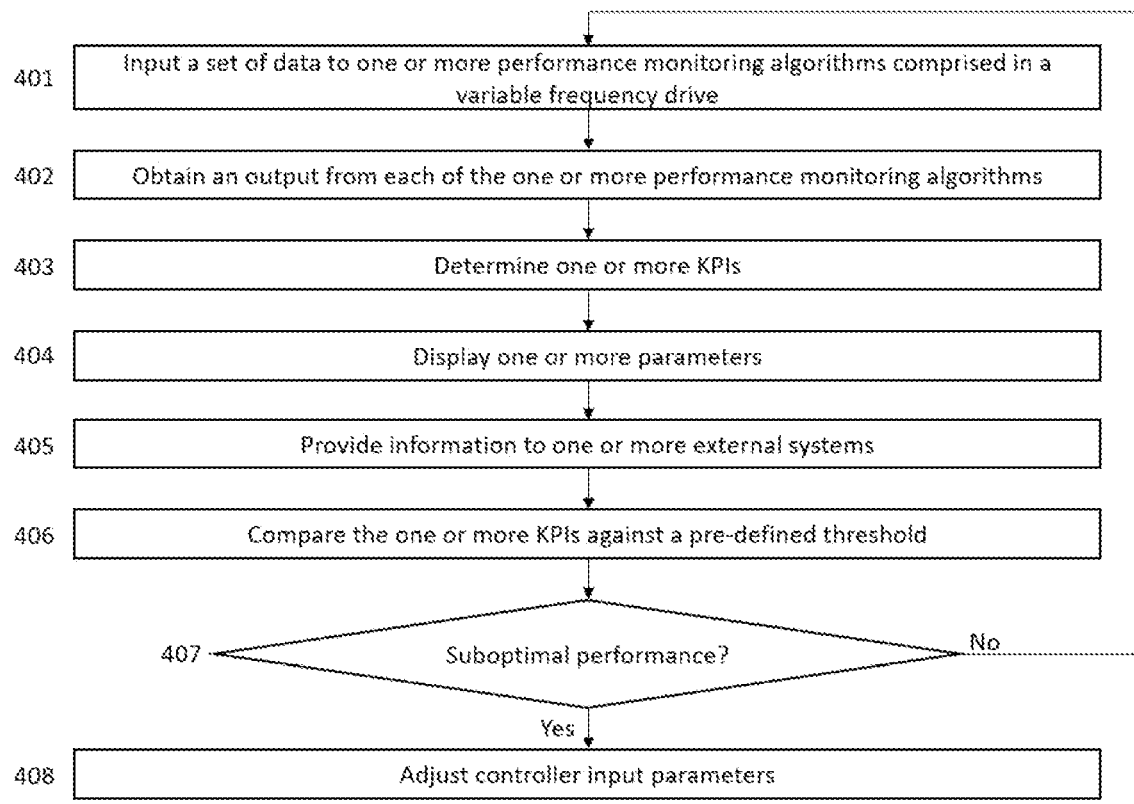

FIG. 4 illustrates a flow chart according to another exemplary embodiment. Referring to FIG. 4, a set of data is inputted 401 to one or more control loop performance monitoring algorithms comprised in a variable frequency drive. The set of data comprises at least a measured value of a process variable, a target value (i.e. set point) for the process variable, a set of controller input parameters, and a controller output. An output from each of the one or more control loop performance monitoring algorithms is then obtained 402 based at least partly on the set of data. One or more key performance indicator values are determined 403 based at least partly on the output from each of the one or more control loop performance monitoring algorithms.

The one or more key performance indicator values and/or the output from each of the one or more control loop performance monitoring algorithms may be displayed 404 for example to a user in a graphical user interface as one or more additional parameters associated with the variable frequency drive and/or its controller.

Information may be provided 405 to one or more external systems, such as a DCS or SCADA system. The information may comprise, for example, the one or more key performance indicator values and/or the output from each of the one or more control loop performance monitoring algorithms.

The one or more key performance indicator values are compared 406 against a pre-defined threshold value to evaluate 407 whether the control loop performance is suboptimal. If the control loop performance is evaluated to be suboptimal (407: yes), the controller is then tuned by adjusting 408 the set of controller input parameters in order to adjust the controller output and thus improve the control loop performance. For example, an automatic or guided controller tuning may be proposed to a user, or the controller tuning may be performed automatically without user involvement. The process may be iterative so that it returns to step 401 after step 407.

If the control loop performance is evaluated to be optimal (407: no), then the process may return to block 401 and continue from there. In other words, the controller output is not adjusted, if the control loop performance is evaluated to be optimal.

Figure 5:
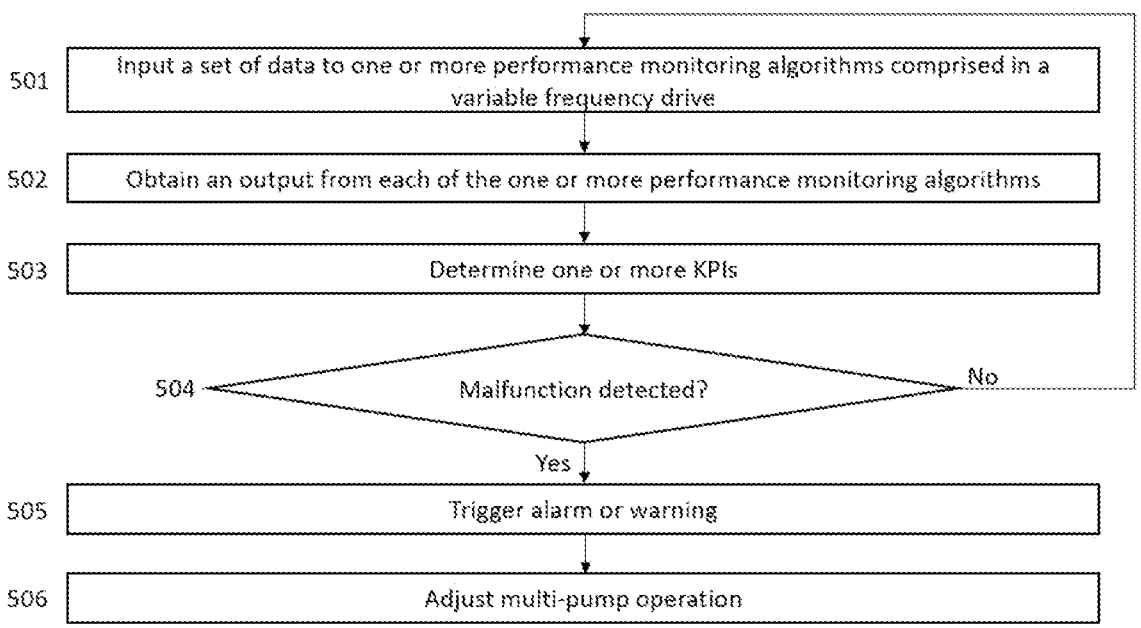

FIG. 5 illustrates a flow chart according to another exemplary embodiment, wherein a problem with the physical process, motor or actuator may be detected by detecting bad control performance or a change in the control performance, caused for example by wear and tear of the actuator such as a pump. In other words, a malfunction associated with a motor or a load, such as a pump, controlled by the variable frequency drive may be detected based at least partly on the output from each of the one or more control loop performance monitoring algorithms.

Referring to FIG. 5, a set of data is inputted 501 to one or more control loop performance monitoring algorithms comprised in a variable frequency drive. The set of data comprises at least a measured value of a process variable, a target value (i.e. set point) for the process variable, a set of controller input parameters, and a controller output. An output from each of the one or more control loop performance monitoring algorithms is then obtained 502 based at least partly on the set of data. One or more key performance indicator values are determined 503 based at least partly on the output from each of the one or more control loop performance monitoring algorithms.

The one or more key performance indicator values are then compared for example against a pre-defined threshold value to detect 504 whether the key performance indicator values indicate a problem or a malfunction with the motor or load. For example, the problem or malfunction, such as a pump tear, may be detected if the one or more key performance indicator values indicate a high number of oscillations.

If no malfunction is detected (504: no), then the process may return to block 501 and continue from there.

If a malfunction is detected (504: yes), an alarm or warning may be triggered 505 and indicated for example to a user and/or to a higher-level industrial control system, such as a DCS system.

The variable frequency drive may be used to control a plurality of motors and/or loads, such as pumps. If the loads are pumps, this may be referred to as multi-pump operation. As an example, if the variable frequency drive is used to control a plurality of pumps, then the one or more key performance indicator values may be used to detect differences between different pumps and they may be one possible indicator for the wear, i.e. deterioration, of one or more pumps. Thus, multi-pump operation may be adjusted 506 based on the detection of a malfunction such as a pump tear. For example, if a malfunction is detected with one of the pumps, then the malfunctioning pump may be stopped or slowed down, and the other pumps may be adjusted to compensate for the stopped/slowed pump.

Figure 6:
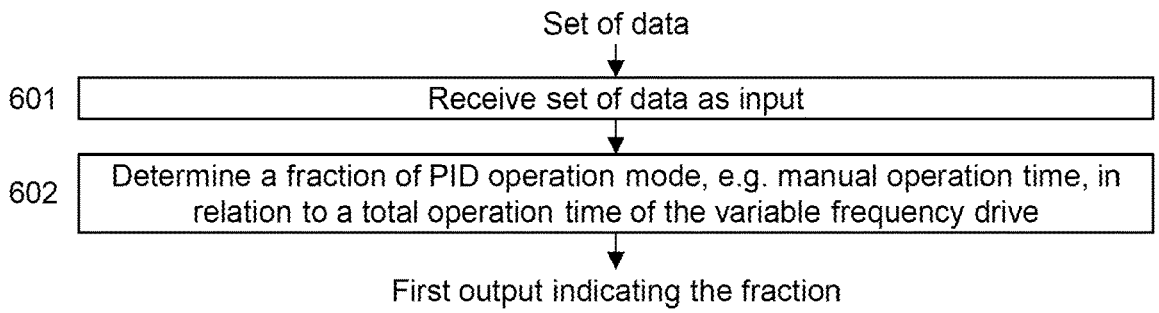

FIG. 6 illustrates a flow chart according to an exemplary embodiment for a first control loop performance monitoring algorithm of the one or more control loop performance monitoring algorithms. The first control loop performance monitoring algorithm may be used for PID operation mode monitoring, i.e. to determine, or record, a fraction of the PID operation mode, for example a manual operation time, in relation to a total operation time of the variable frequency drive. Manual operation time refers to the time during which the control loop is in manual mode, wherein a user makes adjustments to the final control element, such as a motor. A high rate of manual operation time may indicate suboptimal parameterization of the PID controller. In automatic mode, the PID controller automatically makes the adjustments to the final control element. The manual operation time may be determined for example based on the PID controller output. The operation mode may also be determined for example based on a drive parameter indicating the current operation mode.

Referring to FIG. 6, the first control loop performance monitoring algorithm of the one or more control loop performance monitoring algorithms receives 601 a set of data as input. The set of data comprises at least a measured value of a process variable, a target value (i.e. set point) for the process variable, a set of controller input parameters, and a controller output. The first control loop performance monitoring algorithm determines 602 a first output indicating a fraction of a manual operation time in relation to a total operation time of the variable frequency drive based at least partly on the set of data inputted to the first control loop performance monitoring algorithm.

Figure 7:
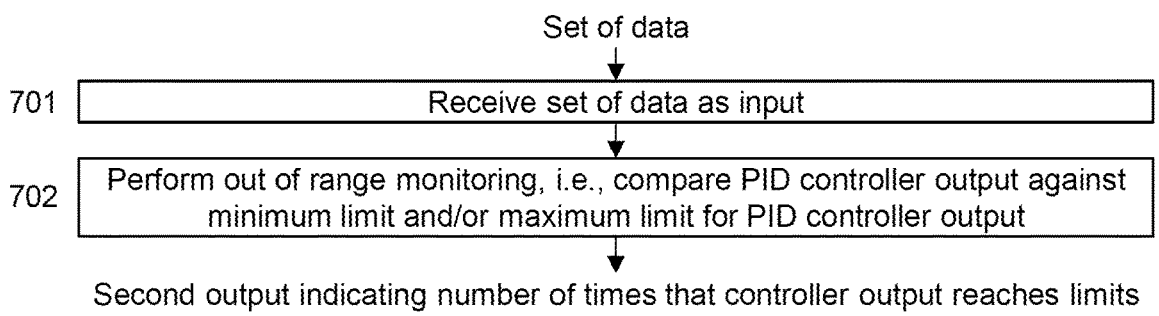

FIG. 7 illustrates a flow chart according to an exemplary embodiment for a second control loop performance monitoring algorithm of the one or more control loop performance monitoring algorithms. The second control loop performance monitoring algorithm may be used for out of range monitoring, i.e. to compare the PID controller output against a minimum limit and/or a maximum limit for the PID controller output. Frequent reaching of the output trim, i.e. the minimum and/or maximum limit of the PID controller output, may indicate suboptimal control loop operation.

Referring to FIG. 7, the second control loop performance monitoring algorithm of the one or more control loop performance monitoring algorithms receives 701 a set of data as input. The set of data comprises at least a measured value of a process variable, a target value (i.e. set point) for the process variable, a set of controller input parameters, and a controller output. The second control loop performance monitoring algorithm determines 702 a second output indicating a number of times of the controller output reaching the pre-defined minimum limit and/or the pre-defined maximum limit based at least partly on the set of data inputted to the second control loop performance monitoring algorithm.

Figure 8:
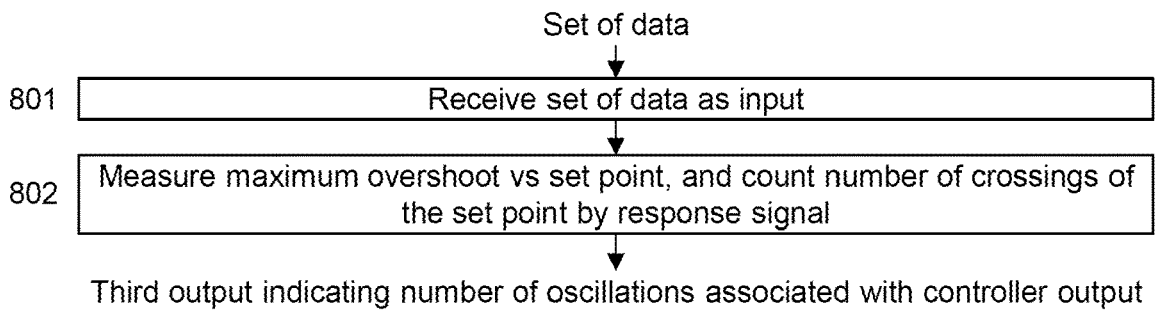

FIG. 8 illustrates a flow chart according to an exemplary embodiment for a third control loop performance monitoring algorithm of the one or more control loop performance monitoring algorithms. The third control loop performance monitoring algorithm may be used to detect oscillations associated with the PID controller output. Herein oscillation refers to the fluctuation of the response signal, i.e. the measured process variable, around the set point. For example, the process variable may exceed the set point at a first time instant, be below the set point at a following second time instant, and then again exceed the set point at a following third time instant. In other words, the third control loop performance monitoring algorithm may measure maximum overshoot vs the set point, and a number counting the crossings of the set point by the response signal. The set of algorithm parameters for the third control loop performance monitoring algorithm may comprise, for example, a signal sampling rate to count the crossing of the set point while overshooting. The set of algorithm parameters for the third control loop performance monitoring algorithm may further comprise, for example, a threshold between the set point and the response signal for finalizing the measurement, i.e. to stop counting the crossings when the response reaches a certain threshold, such as 0.01, around the set point and stays within the threshold for a pre-defined period of time, such as 0.2 seconds. An oscillating PID controller output may indicate suboptimal controller tuning performance. Sinusoidal oscillations may be introduced in process variables for example due to poor tuning settings, actuator faults or external disturbances. Furthermore, some control loops may comprise a nonlinear element, such as a faulty valve, and thus cause nonlinearity in the time trend of the process variable and the PID controller output. A nonlinear disturbance may affect the process variable regularly and repetitively, but it may contain higher frequency components, and thus these nonlinear oscillations may be distinguished from a sinusoidal oscillation.

Referring to FIG. 8, the third control loop performance monitoring algorithm of the one or more control loop performance monitoring algorithms receives 801 a set of data as input. The set of data comprises at least a measured value of a process variable, a target value (i.e. set point) for the process variable, a set of controller input parameters, and a controller output. The third control loop performance monitoring algorithm determines 802 a third output indicating a number of oscillations associated with the controller output based at least partly on the set of data inputted to the third control loop performance monitoring algorithm.

Figure 9:
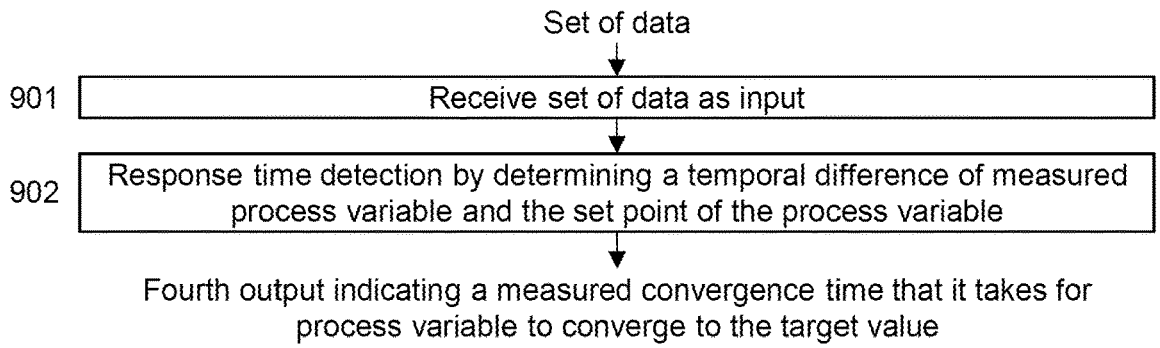

FIG. 9 illustrates a flow chart according to an exemplary embodiment for a fourth control loop performance monitoring algorithm of the one or more control loop performance monitoring algorithms. The fourth control loop performance monitoring algorithm of the one or more control loop performance monitoring algorithms may be used for response time detection by determining a temporal difference of the measured process variable and the set point of the process variable. Herein temporal difference refers to the time interval between the set point change and the time that it takes for the response to reach the changed set point, or a pre-defined threshold around the set point. A high overshoot, i.e. a high temporal difference, may indicate suboptimal control loop performance. In other words, the fourth control loop performance monitoring algorithm may measure the time to convergence of the response towards the set point, for example when the set point is changed. Herein response refers to the adjusted value of the process variable caused by the control action, i.e. the PID controller output. The set of algorithm parameters for the fourth control loop performance monitoring algorithm may comprise, for example, a threshold between the response and the set point for finalizing the measurement. In other words, the response may be considered as converged to the set point, if the response stays within the threshold for a pre-defined period of time. The set of algorithm parameters for the fourth control loop performance monitoring algorithm may further comprise, for example, a maximum delay.

Referring to FIG. 9, the fourth control loop performance monitoring algorithm of the one or more control loop performance monitoring algorithms receives 901 a set of data as input. The set of data comprises at least a measured value of a process variable, a target value (i.e. set point) for the process variable, a set of controller input parameters, and a controller output. The fourth control loop performance monitoring algorithm determines 902 a fourth output indicating a measured convergence time that it takes for the process variable to converge to the target value based at least partly on the set of data inputted to the fourth control loop performance monitoring algorithm.

An example of KPI calculation is provided in the following. For example, the third control loop performance monitoring algorithm may be used to detect the number of oscillations, and the fourth control loop performance monitoring algorithm may be used to determine the time to convergence for example in seconds. The detected number of oscillations and the time to convergence are then provided as input to the KPI calculation module. First, the KPI calculation module may scale the values provided by the algorithms. For example, the output of the third control loop performance monitoring algorithm may be scaled such that no crossing of the set point is 100%, while 5 crossings or more is 0%. The output of the fourth control loop performance monitoring algorithm may also be scaled such that a convergence time of 1 seconds or below is 100%, while 10 seconds or above is 0%. Second, the outputs of different control loop performance monitoring algorithms may be balanced by using weights. For example, a weight with a value of 0.5 may be applied to the scaled value of each algorithm in order to obtain balanced KPIs between 0% and 100%. In other words, the scaled value of each algorithm may be multiplied by 0.5 in this case. However, if it is desirable to prioritize the output of one algorithm over the output of another algorithm, then different weights may be applied to the algorithm outputs. For example, a weight of 0.6 may be applied to the scaled value of the convergence time, and a weight of 0.4 may be applied to the scaled value of the number of oscillations in order to prioritize the convergence time over the number of oscillations.

A technical advantage provided by some exemplary embodiments may be that they may enable control loop performance monitoring within the firmware of the variable frequency drive. Thus, some exemplary embodiments may enable control loop performance monitoring within the variable frequency drive without requiring any external hardware and/or software systems for the control loop performance monitoring. Furthermore, some exemplary embodiments may provide local in-device feedback for example to a user on suboptimal PID parameterization, thus preventing unnecessary equipment wear, such as motor wear due to oscillations of the PID controller output, and/or energy losses. Some exemplary embodiments may also provide an autotuning mechanism for automatically setting, or adjusting, the PID parameters, which may improve process performance. In addition, some exemplary embodiments may provide the variable frequency drive with additional information regarding the process and/or equipment that it is controlling. For example, some exemplary embodiments may enable the variable frequency drive to detect wear or malfunction of a sensor device in the control loop. Some exemplary embodiments may be used to provide feedback of PID quality attributes to higher-level systems, such as a DCS, and/or to same-level systems, such as parallel PID controllers in a multi-pump configuration, thus enabling system-wide monitoring across control loops. Moreover, some exemplary embodiments may provide a higher robustness and/or reliability of the system, since the control loop performance monitoring does not depend on external systems that may eventually fail or experience malfunctions.

Figure 10:
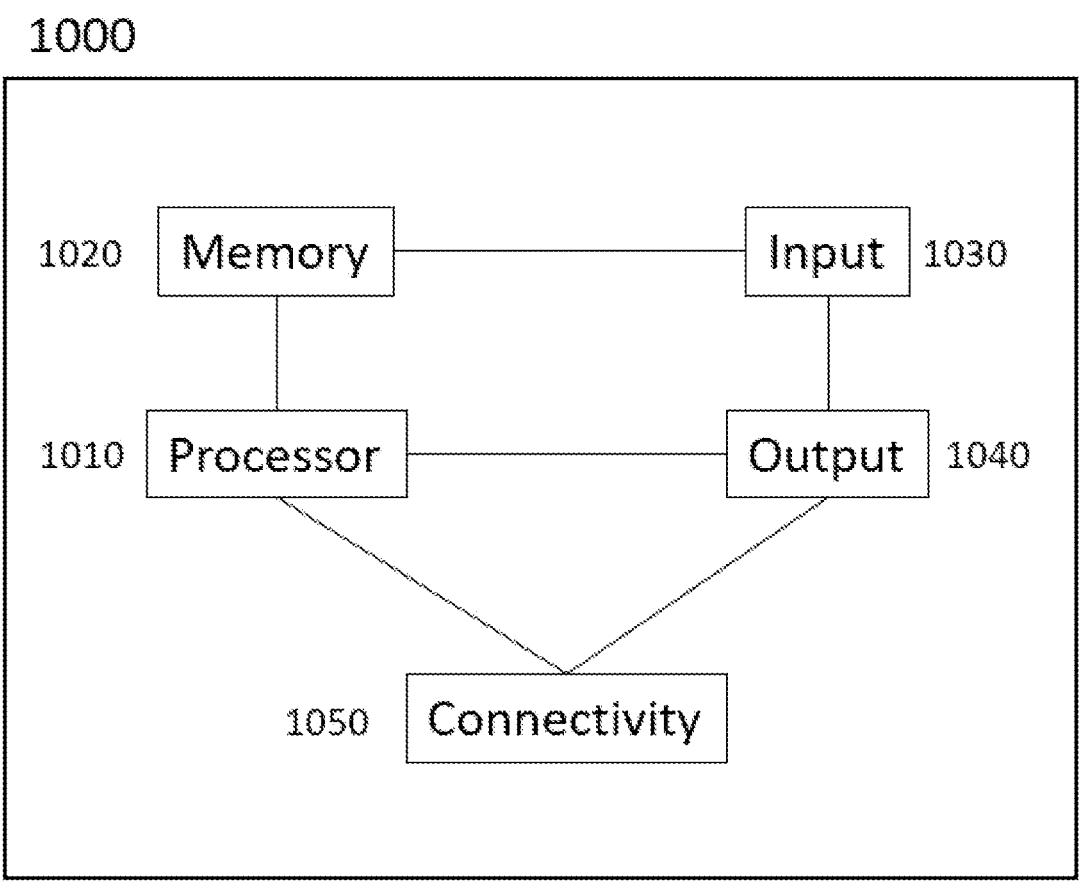
FIG. 10 illustrates an apparatus according to an exemplary embodiment.

FIG. 10 illustrates an apparatus 1000, which may be an apparatus such as, or comprised in, a variable frequency drive according to an exemplary embodiment. The apparatus 1000 comprises a processor 1010. The processor 1010 interprets computer program instructions and processes data. The processor 1010 may comprise one or more programmable processors. The processor 1010 may comprise programmable hardware with embedded firmware and may, alternatively or additionally, comprise one or more application specific integrated circuits, ASICs.

The processor 1010 is coupled to a memory 1020. The processor is configured to read and write data to and from the memory 1020. The memory 1020 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 1020 stores computer readable instructions that are executed by the processor 1010. For example, non-volatile memory stores the computer readable instructions and the processor 1010 executes the instructions using volatile memory for temporary storage of data and/or instructions.

The computer readable instructions may have been pre-stored to the memory 1020 or, alternatively or additionally, they may be received, by the apparatus, via electromagnetic carrier signal and/or may be copied from a physical entity such as computer program product. Execution of the computer readable instructions causes the apparatus 1000 to perform the functionality described above.

In the context of this document, a "memory" or "computer-readable media" may be any non-transitory media or means that can contain, store, communicate, propagate or transport the instructions for use by or in connection with an instruction execution system, apparatus, or device, such as a computer.

The apparatus 1000 further comprises, or is connected to, an input unit 1030. The input unit 1030 comprises one or more interfaces for receiving input. The one or more interfaces may comprise for example one or more buttons and/or one or more touch detection units. Further, the input unit 1030 may comprise an interface to which external devices may connect to, and/or a user interface that a user may use to enter one or more inputs to the apparatus 1000.

The apparatus 1000 may also comprise an output unit 1040. The output unit may comprise or be connected to one or more displays capable of rendering visual content such as a light emitting diode, LED, display, a liquid crystal display, LCD or a liquid crystal on silicon, LCoS, display.

The apparatus 1000 may further comprise a connectivity unit 1050. The connectivity unit 1050 enables wired and/or wireless connectivity to external networks and/or devices. The connectivity unit 1050 may comprise one or more antennas and one or more receivers that may be integrated to the apparatus 1000 or the apparatus 1000 may be connected to. The connectivity unit 1050 may comprise an integrated circuit or a set of integrated circuits that provide the wireless communication capability for the apparatus 1000. Alternatively, the wireless connectivity may be a hardwired application specific integrated circuit, ASIC.

It is to be noted that the apparatus 1000 may further comprise various components not illustrated in FIG. 10. The various components may be hardware components and/or software components.

As used in this application, the term "circuitry" may refer to one or more or all of the following:
a. hardware-only circuit implementations (such as implementations in only analog and/or digital circuitry) and b. combinations of hardware circuits and software, such as (as applicable):
   i. a combination of analog and/or digital hardware circuit(s) with software/firmware and
   ii. any portions of hardware processor(s) with software (including digital signal processor(s)), software, and memory(ies) that work together to cause an apparatus, such as a mobile phone, to perform various functions) and
c. hardware circuit(s) and or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of exemplary embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given drawings, as will be appreciated by one skilled in the art.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

What is claimed is:

1. A variable frequency drive comprising at least one processor, and at least one memory including computer program code, wherein the at least one memory and the computer program code are configured, with the at least one processor, to cause the variable frequency drive to:

input a set of data to one or more control loop performance monitoring algorithms comprised in the variable frequency drive, wherein the set of data comprises at least a measured value of a process variable associated with a physical process influenced by the variable frequency drive via a motor and an actuator, a target value for the process variable a set of controller input parameters of a process controller controlling the variable frequency drive, and a controller output of the process controller;

obtain an output from each of the one or more control loop performance monitoring algorithms based at least partly on the set of data, wherein the output indicates at least one of: a fraction of a manual operation time in relation to a total operation time of the variable frequency drive, a number of times of the controller output reaching a pre-defined minimum limit and/or a pre-defined maximum limit, a number of oscillations associated with the controller output, or a measured convergence time that it takes for the process variable to converge to the target value;

determine one or more key performance indicator values based at least partly on the output from each of the one or more control loop performance monitoring algorithms, wherein the one or more key performance indicator values indicate a problem or quality associated with control loop performance; and adjust the set of controller input parameters based at least partly on the one or more key performance indicator values.

2. The variable frequency drive of claim 1, wherein the one or more key performance indicator values are determined by applying a weight value to the output obtained from at least one of the one or more control loop performance monitoring algorithms.

3. The variable frequency drive of claim 1, wherein the one or more key performance indicator values are determined by converting the output obtained from each of the one or more control loop performance monitoring algorithms to a scaled value between 0-100%, and applying a weight value to the scaled value.

4. The variable frequency drive of claim 1, wherein the process controller comprises a proportional-integral-derivative controller, and wherein the set of controller input parameters comprises at least a proportional controller gain, an integration time and a derivation time associated with the proportional-integral-derivative controller comprised in the variable frequency drive; and wherein the controller output comprises at least a speed and/or a torque applied to the motor connected to the variable frequency drive, wherein the controller output is provided by the proportional-integral-derivative controller.

5. The variable frequency drive of claim 4, wherein the set of data further comprises a first drive parameter indicating whether the proportional-integral-derivative controller is enabled, a second drive parameter indicating whether the controller output is frozen, a third drive parameter indicating whether the pre-defined minimum limit for the controller output is triggered, and/or a fourth drive parameter indicating whether the pre-defined maximum limit for the controller output is triggered.

6. The variable frequency drive of claim 1, wherein the variable frequency drive is further caused to:

determine, by a first control loop performance monitoring algorithm of the one or more control loop performance monitoring algorithms, a first output indicating the fraction of the manual operation time in relation to the total operation time of the variable frequency drive wherein the one or more key performance indicator values are determined based at least on the first output.

7. The variable frequency drive of claim 1, wherein the variable frequency drive is further caused to:

determine, by a second control loop performance monitoring algorithm of the one or more control loop performance monitoring algorithms, a second output indicating the number of times of the controller output reaching a pre-defined minimum limit and/or a pre-defined maximum limit wherein the one or more key performance indicator values are determined based at least on the second output.

8. The variable frequency drive of claim 1, wherein the variable frequency drive is further caused to:

determine, by a third control loop performance monitoring algorithm of the one or more control loop performance monitoring algorithms, a third output indicating the number of oscillations associated with the controller output;

wherein the one or more key performance indicator values are determined based at least on the third output.

9. The variable frequency drive of claim 1, wherein the variable frequency drive is further caused to:

determine, by a fourth control loop performance monitoring algorithm of the one or more control loop performance monitoring algorithms, a fourth output indicating the measured convergence time that it takes for the process variable to converge to the target value wherein the one or more key performance indicator values are determined based at least on the fourth output.

10. The variable frequency drive of claim 1, wherein the variable frequency drive is further caused to:

adjust the set of controller input parameters based at least partly on the output from each of the one or more control loop performance monitoring algorithms.

11. The variable frequency drive of claim 1, wherein the variable frequency drive is further caused to:

display, to a user, the one or more key performance indicator values and/or the output from each of the one or more control loop performance monitoring algorithms.

12. The variable frequency drive of claim 1, wherein the variable frequency drive is further caused to:

trigger a warning or an alarm based at least partly on the one or more key performance indicator values and/or the output from each of the one or more control loop performance monitoring algorithms.

13. The variable frequency drive of claim 1, wherein the variable frequency drive is further caused to:

provide, to one or more external systems, the one or more key performance indicator values and/or the output from each of the one or more control loop performance monitoring algorithms.

14. The variable frequency drive of claim 1, wherein the variable frequency drive is further caused to:

detect a malfunction associated with a motor or a load controlled by the variable frequency drive based at least partly on the one or more key performance indicator values and/or the output from each of the one or more control loop performance monitoring algorithms.

15. The variable frequency drive of claim 1, wherein the variable frequency drive is further caused to:

adjust a plurality of motors and/or pumps based at least partly on the one or more key performance indicator values and/or the output from each of the one or more control loop performance monitoring algorithms.

16. The variable frequency drive of claim 1, wherein the variable frequency drive is further caused to:

compare the one or more key performance indicator values against a pre-defined threshold;

wherein the set of controller input parameters is adjusted based on the comparing.

17. The variable frequency drive of claim 1, wherein the one or more key performance indicator values indicate at least a magnitude of a problem associated with the control loop performance.

18. A system comprising at least a sensor device, a variable frequency drive, and a motor;

wherein the sensor device is configured to:

measure a value of a process variable associated with a physical process influenced by the variable frequency drive via the motor and an actuator; and transmit the value of the process variable to the variable frequency drive;

wherein the variable frequency drive is configured to:

receive the value of the process variable from the sensor device;

input a set of data to one or more control loop performance monitoring algorithms comprised in the variable frequency drive, wherein the set of data comprises at least the value of the process variable, a target value for the process variable, a set of controller input parameters of a process controller controlling the variable frequency drive, and a controller output of the process controller;

obtain an output from each of the one or more control loop performance monitoring algorithms based at least partly on the set of data, wherein the output indicates at least one of: a fraction of a manual operation time in relation to a total operation time of the variable frequency drive, a number of times of the controller output reaching a pre-defined minimum limit and/or a pre-defined maximum limit, a number of oscillations associated with the controller output, or a measured convergences time that it takes for the process variable to converge to the target value;

determine one or more key performance indicator values based at least partly on the output from each of the one or more control loop performance monitoring algorithms, wherein the one or more key performance indicator values indicate a problem or quality associated with control loop performance; and adjust the controller output by adjusting the set of controller input parameters based at least partly on the one or more key performance indicator values;

wherein the motor is configured to:

adjust the physical process via the actuator based at least partly on the controller output adjusted by the variable frequency drive.

19. A method comprising:

inputting, by a variable frequency drive, a set of data to one or more control loop performance monitoring algorithms comprised in the variable frequency drive, wherein the set of data comprises at least a measured value of a process variable associated with a physical process influenced by the variable frequency drive via a motor and an actuator, a target value for the process variable, a set of controller input parameters of a process controller controlling the variable frequency drive, and a controller output of the process controller;

obtaining, by the variable frequency drive, an output from each of the one or more control loop performance monitoring algorithms based at least partly on the set of data, wherein the output indicates at least one of a fraction of a manual operation time in relation to a total operation time of the variable frequency drive, a number of times of the controller output reaching a pre-defined minimum limit and/or a pre-defined maximum limit, a number of oscillations associated with the controller output, or a measured convergence time that it takes for the process variable to converge to the target value;

determining, by the variable frequency drive, one or more key performance indicator values based at least partly on the output from each of the one or more control loop performance monitoring algorithms, wherein the one or more key performance indicator values indicate a problem or quality associated with control loop performance; and adjusting, by the variable frequency drive, the set of controller input parameters based at least partly on the one or more key performance indicator values.

20. A computer program product comprising a non-transitory computer readable medium and computer instructions which are stored on said computer readable medium, wherein the computer instructions, when executed by one or more processors of a variable frequency drive, cause the variable frequency drive to perform at least the following:

input a set of data to one or more control loop performance monitoring algorithms comprised in the variable frequency drive, wherein the set of data comprises at least a measured value of a process variable associated with a physical process influenced by the variable frequency drive via a motor and an actuator, a target value for the process variable, a set of controller input parameters of a process controller controlling the variable frequency drive, and a controller output of a process controlled;

obtain an output from each of the one or more control loop performance monitoring algorithms based at least partly on the set of data, wherein the output indicates at least one of: a fraction of a manual operation time in a relation to a total operation time of the variable frequency drive, a number of times of the controller output reaching a pre-defined minimum limit and/or a pre-defined maximum limit, a number of oscillations associated with the controller output, or a measured convergence time that it takes for the process variable to converge to the target value;

determine one or more key performance indicator values based at least partly on the output from each of the one or more control loop performance monitoring algorithms, wherein the one or more key performance indicator values indicate a problem or quality associated with control loop performance; and adjust the set of controller input parameters based at least partly on the one or more key performance indicator values.

* * * * *